United States Patent [19]

Boardman et al.

[11] Patent Number: 5,585,955
[45] Date of Patent: Dec. 17, 1996

[54] POLYGONAL MIRROR OPTICAL SCANNING SYSTEM

[75] Inventors: John D. Boardman, Garland; James R. Boyd; Jeffrey P. Welch, both of Plano, all of Tex.

[73] Assignee: E-Systems, Inc., Dallas, Tex.

[21] Appl. No.: 330,834

[22] Filed: Oct. 27, 1994

Related U.S. Application Data

[62] Division of Ser. No. 963,549, Oct. 20, 1992, Pat. No. 5,392,149.

[51] Int. Cl.⁶ .................................................. G02B 26/08
[52] U.S. Cl. ........................... 359/196; 359/205; 359/216; 359/647; 359/648
[58] Field of Search ................................. 359/205–206, 359/216–219, 647–648, 662, 672–675, 641, 196, 212, 223, 226; 250/234–236

[56] References Cited

U.S. PATENT DOCUMENTS

| | | | |
|---|---|---|---|
| 4,030,806 | 6/1977 | Groshima et al. | 359/217 |
| 4,099,829 | 7/1978 | Straayer | 359/205 |
| 5,013,133 | 5/1991 | Buralli et al. | 359/900 |
| 5,200,861 | 4/1993 | Moskovich | 359/662 |

*Primary Examiner*—James Phan
*Attorney, Agent, or Firm*—Harold E. Meier

[57] ABSTRACT

An optical system for scanning a light beam across an object where the light beam is double reflected by the reflection surfaces of a rotating polygonal mirror. Beam expander optics are included in the light path for the light beam following the first reflection by the polygonal mirror to magnify the beam diameter to fill the length of the reflective surface of the polygonal mirror at the second reflection. The beam expander optics further include lenses for demagnifying scan angle in the light beam following the first reflection. The lenses of the beam expander optics are formed with a Petzval curvature (third order Seidel aberration) to correct for the distortion induced in the optics image plane by the longitudinal shift in the entrance pupil position at the first reflection as the polygonal mirror rotates.

3 Claims, 5 Drawing Sheets

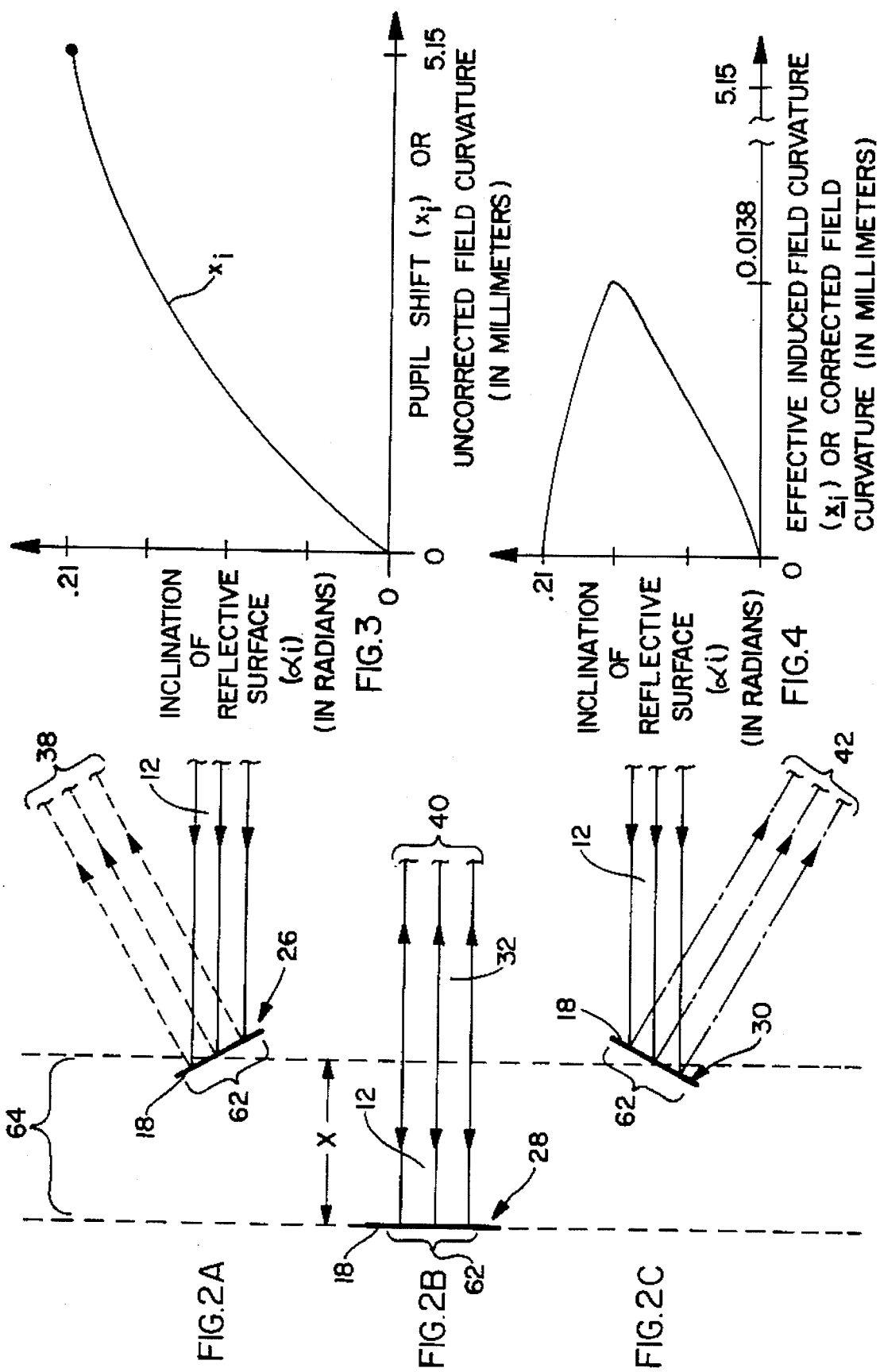

POLYGONAL MIRROR OPTICAL SCANNING SYSTEM

This is a division of application Ser. No. 07/963,549 filed on Oct. 20, 1992, now U.S. Pat. No. 5,392,149.

TECHNICAL FIELD

The present invention relates to optical scanning systems and, in particular, to an optical scanning system wherein a beam of light is reflected by the reflective surfaces of a rotating polygonal mirror to scan across an object.

BACKGROUND OF THE INVENTION

It is common in scanning optical systems used for reading and recording information to employ a rotating polygonal mirror as a light reflector. The polygonal mirror typically comprises a plurality of precisely angled reflecting surfaces (facets) assembled about an axis in an equilateral polygon configuration. Rotation of the polygonal mirror about its axis will cause a light beam incident thereon to be sequentially reflected by each of the facets and repetitively swept with each reflection through a predetermined arc. Optics in the form of lenses and reflectors may also be included in the system to direct the swept beam to scan across the surface of an object.

It is also known to reflect the repetitively swept beam back to the rotating polygonal mirror where the beam is again sequentially reflected by each of the facets and repetitively swept through another predetermined arc. Additional optics may then be utilized to receive and focus the swept beam for scanning of the surface of the object. In such a system, the included optics are further employed to shape the swept beams generated by both the first and second polygonal mirror reflections such that the beam swept by the first reflection by the polygon is expanded to track the rotational movement of the polygon facets at the second reflection. U.S. Pat. Nos. 4,624,528; 4,129,355; 4,030,806 and 3,972,583 are illustrative of the use of a double reflecting scanner system and included optics.

Due to the nature of the rotating polygonal mirror, the point on each reflective surface (facet) of the polygonal mirror where reflection of the light beam occurs is longitudinally shifted with respect to the light path of the incident beam as the polygonal mirror rotates and the reflected beam is swept through the predetermined arc. If optics are included in the system for receiving the swept beam reflected by the rotating polygonal mirror, the entrance pupil for the included optics will also be shifted, in a manner corresponding to the point on the reflective surface, as the polygonal mirror rotates. The shifting (or distortion) of the position of the entrance pupil caused by the rotation of the polygonal mirror results in a field curvature at the image plane of the included optics that adversely distorts the swept beam.

SUMMARY OF THE INVENTION

The optical scanning system of the present invention comprises a rotating mirror for generating a repetitively swept beam and beam expander optics to generate a scanning beam therefrom. The optics include an eyepiece lens having a negative Petzval curvature (aberration) for inducing an inward field curvature in the image plane of the eyepiece lens to correct for the distortion induced in the swept beam by the shifting position of the entrance pupil resulting from rotation of the mirror. The Petzval curvature comprises a third order aberration and is the fourth aberration term of the Seidel aberration polynomial. The generated distortion corrected, swept scanning beam is then focused and scanned across the surface of an object.

In another embodiment of the system, the distortion corrected swept beam is expanded and collimated by an objective lens of the beam expander optics into a scan beam having a diameter substantially equal to the length of each facet of the rotating mirror. The expanded scan beam is then reflected back to the rotating mirror to track the rotational movement of each facet therein and be reflected thereby, with the reflected scan beam sweeping an arc to scan across the surface of the object.

BRIEF DESCRIPTION OF THE DRAWINGS

A more complete understanding of the present invention may be had by reference to the following Detailed Description when taken in conjunction with the accompanying Drawings wherein:

FIGS. 2A, 2B, and 2C illustrate in detail the reflecting of the incident beam by the reflective surfaces of the rotating polygonal mirror shown in FIG. 1B and the longitudinal shifting of the entrance pupil due to rotation of the polygonal mirror;

FIG. 3 is a graph showing the field curvature induced by the longitudinal shift in the entrance pupil position as the polygonal mirror rotates;

FIG. 4 is a graph showing the field curvature for the swept beam following correction by the Petzval curvature of the beam expander eyepiece lens;

DETAILED DESCRIPTION OF THE DRAWINGS

Figure 1A:
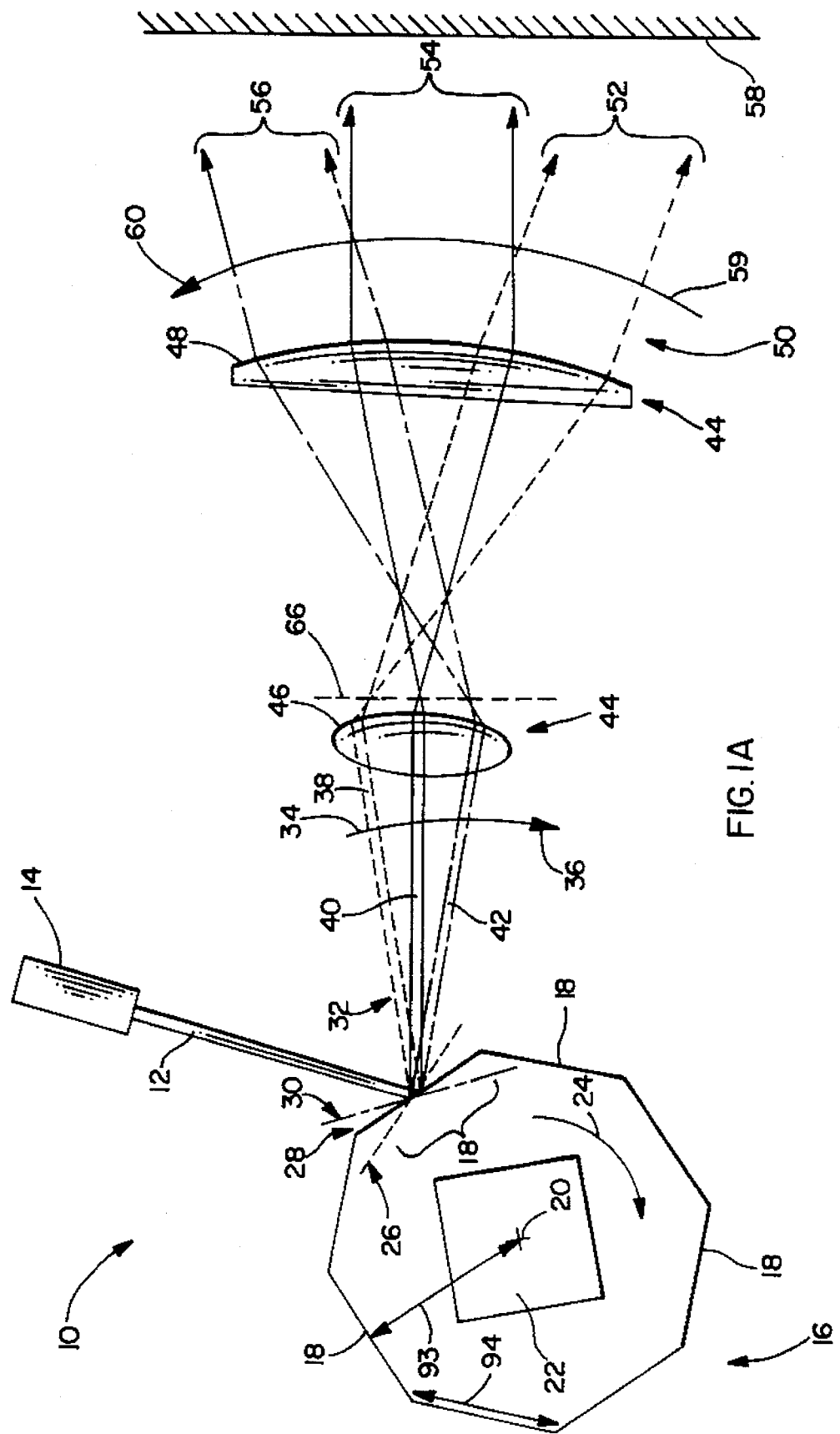
FIG. 1A is a schematic diagram showing one embodiment of the scanning optical system of the present invention.
Figure 1B:
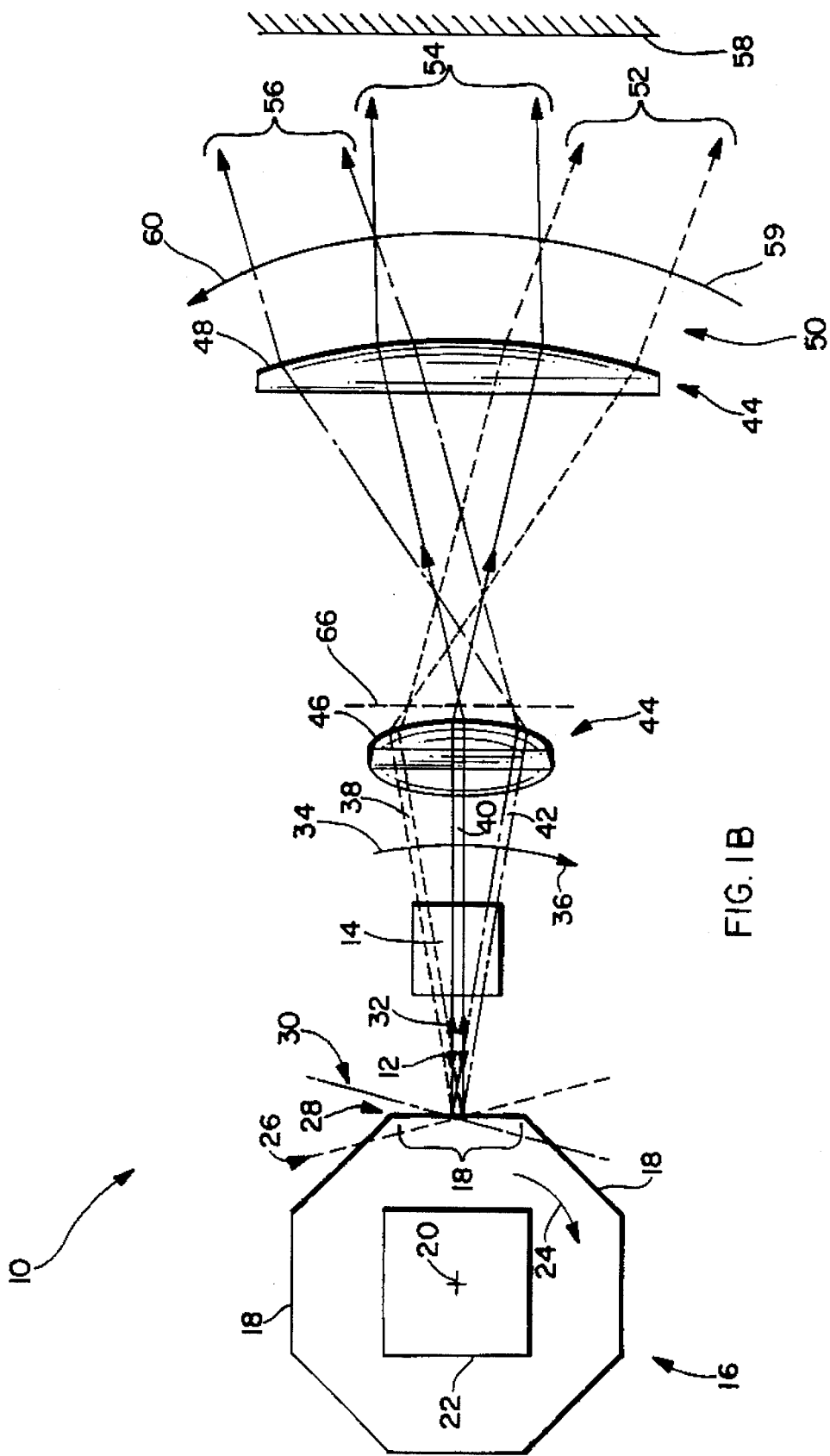
FIG. 1B shows an alternative positioning of the light beam and rotating polygonal mirror illustrated in the system of FIG. 1A.

Reference is now made to FIGS. 1A and 1B wherein there is illustrated the scanning optical system 10 of the present invention. A collimated light beam 12 emitted from a source 14 is directed to a polygonal mirror 16 comprised of a plurality of precisely angled reflective surfaces (or facets) 18 assembled about an axis 20 in an equilateral polygon configuration. A motor 22 having a shaft (not shown) mounted to the polygonal mirror 16 at the axis 20 thereof causes the polygonal mirror to rotate about the axis in the direction indicated by the arrow 24.

With rotation of the polygonal mirror 16, the inclination (or angle) of each reflective surface 18 with respect to the position of the light beam 12 changes from a starting inclination angle 26 through a center inclination angle 28 to an ending inclination angle 30. In FIG. 1A, the light beam 12 is directed at the polygonal mirror 16 but is offset from the axis 20. Conversely, in FIG. 1B, the light beam 12 is aimed directly at the axis 20 of the polygonal mirror 16. In the latter orientation (FIG. 1B), the incident light beam 12 will be orthogonal to the reflective surface 18 at the center inclination angle 28. As the polygonal mirror 16 continues to rotate about the axis 20, the reflective surface 18 moves away from the light beam 12 (following the ending angle 30) and the next reflective surface on the polygonal mirror moves into position (at the starting angle 26) to reflect the light beam.

The rotation of the polygonal mirror 16 and movement of a reflective surface 18 from the starting through ending inclination angles (26 through 28 to 30) causes the light beam 12 to be reflected and generate a reflected beam 32 that is swept by the rotation of the polygonal mirror through a predetermined arc 34 (in the direction indicated by the arrow head 36). The reflected light beam 32 sweeps through the arc 34 from a starting sweep position 38 through a center sweep position 40 to an ending sweep position 42 corresponding to the starting, center and ending inclination angles 26, 28 and 30, respectively, for the reflective surface 18. With continued rotation of the polygonal mirror 16 about the axis 20, subsequent reflective surfaces 18 sequentially move into position to reflect the light beam 12 causing the reflected light beam 32 to be repetitively swept through the arc 34.

The optical system 10 further includes beam expander optics 44 comprising an eyepiece lens 46 and an objective lens 48. It will, of course, be understood that the eyepiece lens 46 and objective lens 48 may each include a plurality of lenses and that the single lenses shown for each in FIG. 1A are illustrative only. The beam expander optics 44 are optically positioned in the swept light path of the reflected light beam 32 such that the eyepiece lens 46 focuses the reflected beam and the objective lens 48 expands and collimates the reflected beam to generate a scanning beam 50. In particular, the beam expander optics 44 function to demagnify the sweep angle of the reflected light beam 32 associated with the arc 34 to repetitively project the scanning beam 50 through an arc 59 across the surface of an object 58 in the direction indicated by the arrow head 60 from a starting scan position 52 through a center scan position 54 to an ending scan position 56 (that correspond to the starting, center and ending sweep positions, 38, 40 and 42, respectively). It should be noted that the nature of the beam expander optics 44 reverses the image of the swept beam 32 such that the direction 60 of the sweep of the scanning beam 50 is opposite than the direction 36 of the swept beam 32. The beam expander optics 44 further function to magnify the diameter of the scanning beam 50 projected on the object 58 or alternatively focus the scanning beam to a spot on the surface of the object if desired.

Referring now to FIGS. 2A, 2B and 2C, there are shown a series of illustrations detailing the reflection of the incident light beam 12, having, by the orientation shown in FIG. 1B, the reflective surfaces 18 of the rotating polygonal mirror 16. FIG. 2A illustrates such reflection when the reflective surface 18 is at the starting angle 26. FIG. 2B illustrates such reflection when the reflective surface 18 is at the center angle 28 and orthogonal to the light beam 12. FIG. 2C illustrates such reflection when the reflective surface 18 is at the ending angle 30. It will, of course, be understood that the dimensions illustrated in FIGS. 2A, 2B and 2C are exaggerated to facilitate a more complete understanding of the reflection process.

An entrance pupil 62 for the eyepiece lens 46 that focuses the reflected light beam 32 is projected on the reflective surface 18 of the polygonal mirror at the point where the light beam 12 is reflected. Rotation of the polygonal mirror 16 such that the reflective surface 18 moves from the starting angle 26 through the center angle 28 to the ending angle 30 causes the position of the entrance pupil 62 to shift as shown at 64 in longitudinal relation to the light path for the light beam 12. The shifting of the position of the entrance pupil 62 due to rotation of the polygonal mirror 16 causes field curvature in the image plane 66 (FIGS. 1A and 1B) of the afocal eyepiece lens 46 that adversely distorts the reflected light beam 32. The amount (x) of longitudinal shift 64 (and hence the induced distortion in the image plane) is determined by the dimensions of the polygonal mirror 16 according to the following equation:

$$x=[R/\cos(\alpha)]-R \tag{1}$$

wherein:

$$R=\text{minor axis length 93 (FIG. 1A)},=L/[2*\tan(\pi/N)], \tag{2}$$

$N$=number of reflective surfaces, $$L=\text{reflective surface length 94 (FIG. 1A)}, \tag{3}$$

$d$=light beam 12 diameter, and $$\alpha=\text{useful scan angle }=(\pi/N)-\arctan\,[d/(2*R)]. \tag{4}$$

The amount of longitudinal shift 64 (corresponding to the induced field curvature at the image plane 66) varies as a function of the rotation of the polygonal mirror 16 according to the following equation based on equation (1):

$$x_i=[R/\cos(\alpha_i)]-R \tag{5}$$

wherein:

$i$=0 through 10, and $\alpha_i=(\alpha,i)/10$.

To correct for the distortion induced in the reflected light beam 32 by the longitudinal shift 64 in the position of the entrance pupil 62, the eyepiece lens 46 is modified by adding a Petzval curvature (a third order Seidel aberration) thereto. The Petzval curvature (p) for the eyepiece lens 46 is given according to the following equation:

$$p=(-\tfrac{1}{2})*[h^2/(f*n)] \tag{6}$$

wherein:

$$h=f*\tan(\alpha), \tag{7}$$

$n$=refractive index, and $f$=eyepiece lens 46 focal length.

Substituting equation (7) into equation (6) yields:

$$p=(-\tfrac{1}{2})*[(f*\tan(\alpha)^2)/n]. \tag{8}$$

Solving for the afocal eyepiece lens 46 focal length (f) yields:

$$f=-2*p*n/\tan\,(\alpha)^2. \tag{9}$$

If the longitudinal pupil shift (x) from equation (1) is assumed to be equal to the desired Petzval curvature (p) (to cancel out the distortion induced by the longitudinal shift), then equation (9) yields:

$$f=2\,*x*n/\tan\,(\alpha)^2. \tag{10}$$

The amount of Petzval curvature (p) should vary as a function of the rotation of the polygonal mirror 16 to substantially cancel the distortion induced by the longitudinal shift in the entrance pupil according to the following equation based on equation (8):

$$p_i = (-\tfrac{1}{2}) * [(f * \tan(\alpha_i)^2)/n] \tag{11}$$

wherein:

f is determined from equation (10).

The effective distortion due to longitudinal shift (corresponding to the corrected field curvature at the image plane 66) is determined according to the following equation based on equations (5) and (11):

$$\underline{x}_i = x_i + p_i \tag{12}$$

wherein:

i=0 through 10.

For a more complete understanding of the effectiveness of the Petzval curvature for correcting the entrance pupil 56 distortion caused by the longitudinal pupil shift 64, consider the following example wherein:

d=1 mm,

L=100 mm,

N=15, and n=1.51.

According to equation (1), the longitudinal pupil shift 64 (x) is equal to 5.147 millimeters. A graph showing the variation in the amount of induced field curvature according to equation (5) as the polygonal mirror 16 rotates is shown in FIG. 3 with the calculated values of $x_i$ shown in column 3 of Table 1. To correct for the 5.147 millimeter distortion, the Petzval curvature requires a focal length (f) according to equation (10) of 351.356 millimeters. The calculated values of the Petzval curvature $P_i$ according to equation (11) are shown in column 4 of Table 1. A graph showing the effective induced field curvature ($\underline{i}_i$) following correction of the longitudinal pupil shift by the Petzval curvature according to equation (12) is shown in FIG. 4 with the calculated values of $\underline{x}_i$ according to equation (12) shown in column 5 of Table 1. FIGS. 3 and 4 and Table 1 illustrate that approximately ninety-nine percent of the induced field curvature ($x_i$) in this example is eliminated ($\underline{x}_i$) through cancellation by the included Petzval aberration ($P_i$).

TABLE 1

| i | $\alpha_i$ (radians) | $x_i$ (mm) | $p_i$ (mm) | $\underline{x}_i$ (mm) |
|---|---|---|---|---|
| 0 | .000000 | .000000 | .000000 | .000000 |
| 1 | .020732 | .050587 | −.050020 | .000567 |
| 2 | .041463 | .202238 | −.200244 | .001994 |
| 3 | .062194 | .455584 | −.451189 | .004395 |
| 4 | .082926 | .811044 | −.803741 | .007303 |
| 5 | .103657 | 1.269540 | −1.259089 | .010451 |
| 6 | .124389 | 1.831553 | −1.818865 | .012688 |
| 7 | .145120 | 2.498788 | −2.484978 | .013810 |
| 8 | .165852 | 3.272762 | −3.259849 | .012913 |
| 9 | .186583 | 4.154797 | −4.146166 | .008631 |
| 10 | .207315 | 5.147241 | −5.147212 | .000029 |

Figure 5:
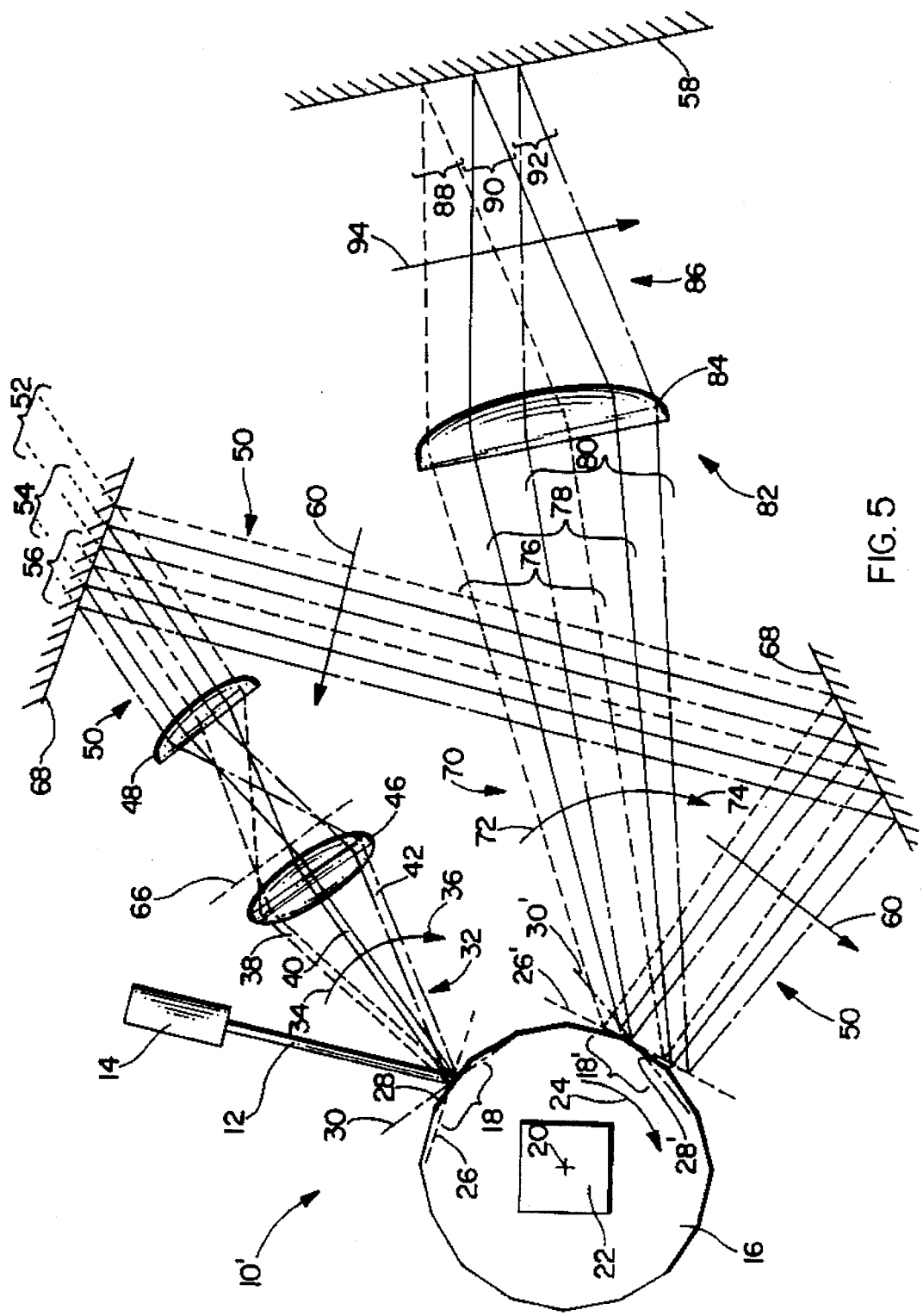
FIG. 5 is a schematic diagram showing another embodiment of the scanning optical system of the present invention.

Referring now to FIG. 5, there is shown another embodiment of the scanning optical system 10' of the present invention wherein the scanning light beam 50 is directed back toward the rotating polygonal mirror 16 by a pair of reflecting mirrors 68. Movement of the scanning light beam 50 from the starting scan position 52 through the center scan position 54 to the ending scan position 56 tracks and corresponds with the inclination movement of a reflective surface 18' on the polygonal mirror 16 from a starting, center and ending angles 26', 28' and 30', respectively. As mentioned earlier, the beam expander optics 44 function to magnify the diameter of the projected scanning beam 50 and decrease the scanning angle arc. Preferably, the diameter of the scanning beam is magnified to be substantially equal to the length of the reflective surface 18'.

Movement of the reflective surface 18' due to rotation of the polygonal mirror 16 causes the scanning beam 50 to be reflected and generate a secondary reflected beam 70 that is swept by the rotation of the polygonal mirror through an arc 72 (in the direction indicated by the arrow head 74). The secondary reflected light beam 70 sweeps through the arc 72 from a starting secondary sweep position 76 through a center secondary sweep position 78 to an ending secondary sweep position 80 corresponding to the starting, center and ending angles 26', 28' and 30', respectively, for the reflective surface 18'. With continued rotation of the polygonal mirror 16 about the axis 20, subsequent reflective surfaces 18' move into position to reflect the scanning beam 50 causing the secondary reflected light beam 70 to be repetitively swept through the arc 72.

The optical system 10' further includes focusing optics 82 comprising a focusing lens 84. It will, of course, be understood that the focusing lens 84 may include a plurality of lenses and that the single lens shown in FIG. 5 is illustrative only. It will, of course, further be understood that focusing optics 82 may not be required in every application of the system 10'. The focusing optics 82 are optically positioned in the light path of the secondary reflected light beam 70 to generate a secondary scanning beam 86 such that the focusing lens 84 focuses the secondary reflected beam to a spot on the surface of the object 58. The focusing optics 82 further function to project the secondary scanning beam 86 from a starting secondary scan position 88 through a center secondary scan position 90 to an ending secondary scan position 92 (that correspond with the starting, center and ending secondary sweep positions, 76, 78 and 80, respectively) parallel to each other to repetitively scan across the surface of the object 58 in the direction indicated by the arrow 94.

Figure 6:
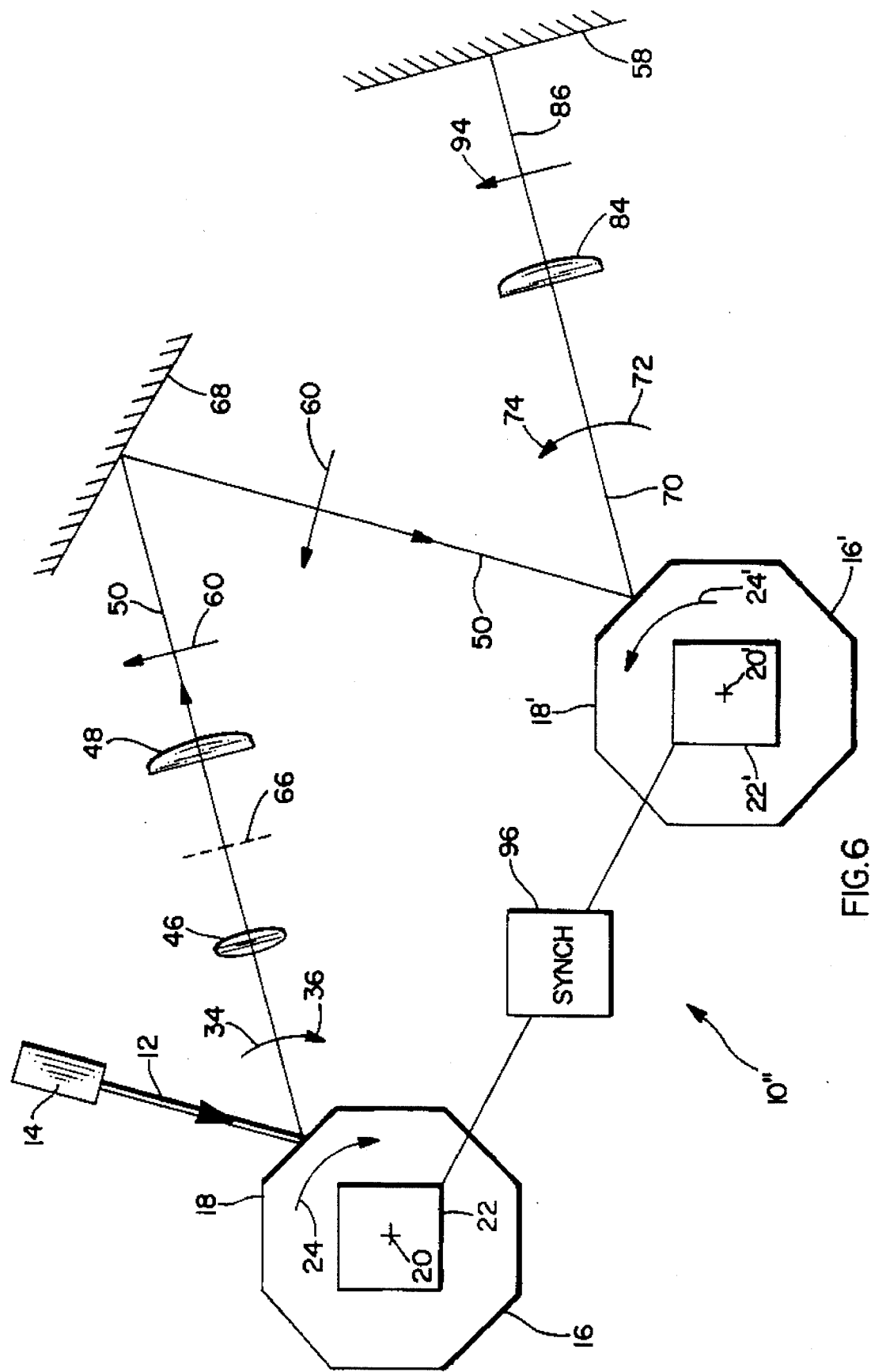
FIG. 6 is a schematic diagram showing another embodiment of the scanning optical system of the present invention.

The embodiments disclosed above utilize a single rotating polygonal mirror 16 in either a single reflection (FIGS. 1A and 1B) or double reflection (FIG. 5) operation. It will, of course, be understood that two separate rotating polygonal mirrors 16 and 16' having corresponding reflective surfaces 18 and 18' therein as in FIG. 6, may be provided in another embodiment of the scanning optical system 10" for double reflection operation. The reflective surfaces 18 of the first polygonal mirror 16 need not be the same size as the reflective surfaces 18' of the second polygonal mirror 16' provided the relative rates of rotation of the polygonal mirrors are adjusted to account for the different reflective surface sizes and the magnification of the beam expander optics is adjusted to properly size the diameter of the scanning beam 50 incident on the second polygonal mirror. Synchronization and adjustment of the rotation of the polygonal mirrors 16 and 16' is provided by the synch means 96 coupled to the motors 22 and 22' of each polygonal mirror.

Although several embodiments of the scanning optical system of the present invention have been illustrated in the accompanying Drawings and described in the foregoing Detailed Description, it will be understood that the invention is not limited to the embodiments disclosed but is capable of numerous rearrangements and modifications of parts and elements without departing from the scope of the invention.

We claim:

1. An optical distortion correction apparatus comprising an optical system positioned in the path of a scanning light beam, the optical system having an image plane with an entrance pupil shifted in a longitudinal direction in relation to the path of the scanning light beam, wherein said optical system comprises a beam expander including:

an eyepiece lens including a Petzval curvature for inducing a field curvature in the image plane to correct the entrance pupil shifting in the longitudinal direction in relation to the path of the scanning light beam and focusing the light beam, and an objective lens for magnifying and collimating the focused light beam, said objective lens being located next to the eyepiece.

2. The optical distortion correction apparatus as in claim 1 wherein the Petzval curvature comprises a third order Seidel aberration.

3. The optical distortion correction apparatus as in claim 1 wherein the light beam sweeps through a predetermined arc and further including means for demagnifying any scan angle resulting from the sweep of the light beam through the predetermined arc.

* * * * *